(12) United States Patent
Bennett et al.

(10) Patent No.: US 8,079,034 B2
(45) Date of Patent: Dec. 13, 2011

(54) OPTIMIZING PROCESSOR-MANAGED RESOURCES BASED ON THE BEHAVIOR OF A VIRTUAL MACHINE MONITOR

(75) Inventors: Steven M. Bennett, Hillsboro, OR (US); Andrew V. Anderson, Hillsboro, OR (US); Stalinselvaraj Jeyasingh, Beaverton, OR (US); Alain Kägi, Portland, OR (US); Gilbert Neiger, Portland, OR (US); Richard Uhlig, Hillsboro, OR (US); Xiang Zou, Beaverton, OR (US); Lawrence Smith, Beaverton, OR (US); Scott Rodgers, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1517 days.

(21) Appl. No.: 10/663,163

(22) Filed: Sep. 15, 2003

(65) Prior Publication Data

US 2005/0060702 A1    Mar. 17, 2005

(51) Int. Cl.
*G06F 9/46* (2006.01)
*G06F 9/455* (2006.01)
*G06F 21/00* (2006.01)

(52) U.S. Cl. .................. 718/104; 718/1; 711/6

(58) Field of Classification Search ...... 718/1, 100–108; 709/226; 711/6
See application file for complete search history.

(56) References Cited

U.S. PATENT DOCUMENTS

| | | | |
|---|---|---|---|
| 3,699,532 A | | 10/1972 | Schaffer et al. |
| 3,996,449 A | | 12/1976 | Attanasio et al. |
| 4,207,609 A | | 6/1980 | Luiz et al. |
| 4,319,233 A | | 3/1982 | Matsuoka et al. |
| 4,347,565 A | * | 8/1982 | Kaneda et al. .................. 711/6 |
| 4,403,283 A | | 9/1983 | Myntti et al. |
| 4,419,724 A | | 12/1983 | Branigin et al. |
| 4,430,709 A | | 2/1984 | Schleupen et al. |
| 4,529,870 A | | 7/1985 | Chaum |
| 4,621,318 A | | 11/1986 | Maeda |
| 4,802,084 A | | 1/1989 | Ikegaya et al. |
| 4,916,608 A | * | 4/1990 | Shultz .......................... 718/104 |
| 4,975,836 A | | 12/1990 | Hirosawa et al. |
| 5,063,500 A | * | 11/1991 | Shorter ........................ 709/226 |
| 5,088,031 A | * | 2/1992 | Takasaki et al. .............. 718/100 |
| 5,187,802 A | | 2/1993 | Inoue et al. |
| 5,230,069 A | | 7/1993 | Brelsford et al. |
| 5,237,616 A | | 8/1993 | Abraham et al. |
| 5,287,363 A | | 2/1994 | Wolf et al. |

(Continued)

FOREIGN PATENT DOCUMENTS

EP    0602867    6/1994
(Continued)

OTHER PUBLICATIONS

Uhlig et al., "Intel Virtualization Technology", IEEE, May 2005, pp. 48-56.*

(Continued)

*Primary Examiner* — Jennifer To
(74) *Attorney, Agent, or Firm* — Thomas R. Lane

(57) ABSTRACT

In one embodiment, a predefined behavior of a virtual machine monitor (VMM) with respect to one or more virtual machines (VMs) is identified, and processor-managed resources associated with the one or more VMs are utilized based on the predefined behavior of the VMM.

6 Claims, 14 Drawing Sheets

U.S. PATENT DOCUMENTS

| | | | |
|---|---|---|---|
| 5,295,251 A | 3/1994 | Wakui et al. | |
| 5,361,375 A | 11/1994 | Ogi | |
| 5,408,617 A * | 4/1995 | Yoshida | 719/319 |
| 5,469,557 A | 11/1995 | Salt et al. | |
| 5,506,975 A | 4/1996 | Onodera | |
| 5,522,075 A * | 5/1996 | Robinson et al. | 718/100 |
| 5,555,385 A | 9/1996 | Osisek | |
| 5,555,414 A | 9/1996 | Hough et al. | |
| 5,560,013 A | 9/1996 | Scalzi et al. | |
| 5,574,936 A | 11/1996 | Ryba et al. | |
| 5,604,805 A | 2/1997 | Brands | |
| 5,628,023 A | 5/1997 | Bryant et al. | |
| 5,633,929 A | 5/1997 | Kaliski, Jr. | |
| 5,668,971 A | 9/1997 | Neufeld | |
| 5,684,948 A | 11/1997 | Johnson et al. | |
| 5,706,469 A | 1/1998 | Kobayashi | |
| 5,740,178 A | 4/1998 | Jacks et al. | |
| 5,752,046 A | 5/1998 | Oprescu et al. | |
| 5,809,546 A | 9/1998 | Greenstein et al. | |
| 5,825,880 A | 10/1998 | Sudia et al. | |
| 5,919,257 A | 7/1999 | Trostle | |
| 5,935,242 A | 8/1999 | Madany et al. | |
| 5,935,247 A | 8/1999 | Pai et al. | |
| 5,944,821 A | 8/1999 | Angelo | |
| 5,956,408 A | 9/1999 | Arnold | |
| 5,978,475 A | 11/1999 | Schneier et al. | |
| 6,035,374 A | 3/2000 | Panwar et al. | |
| 6,044,478 A | 3/2000 | Green | |
| 6,088,262 A | 7/2000 | Nasu | |
| 6,093,213 A | 7/2000 | Favor et al. | |
| 6,108,644 A | 8/2000 | Goldschlag et al. | |
| 6,131,166 A | 10/2000 | Wong-Isley | |
| 6,175,924 B1 | 1/2001 | Arnold | |
| 6,188,257 B1 | 2/2001 | Buer | |
| 6,199,152 B1 | 3/2001 | Kelly et al. | |
| 6,275,933 B1 | 8/2001 | Fine et al. | |
| 6,282,650 B1 | 8/2001 | Davis | |
| 6,327,652 B1 | 12/2001 | England et al. | |
| 6,389,537 B1 | 5/2002 | Davis et al. | |
| 6,397,242 B1 * | 5/2002 | Devine et al. | 718/1 |
| 6,397,379 B1 | 5/2002 | Yates, Jr. et al. | |
| 6,496,847 B1 * | 12/2002 | Bugnion et al. | 718/1 |
| 6,529,909 B1 | 3/2003 | Bowman-Amuah | |
| 6,560,627 B1 | 5/2003 | McDonald et al. | |
| 6,609,199 B1 | 8/2003 | DeTreville | |
| 6,615,278 B1 | 9/2003 | Curtis | |
| 6,651,171 B1 | 11/2003 | England et al. | |
| 6,678,825 B1 | 1/2004 | Ellison et al. | |
| 6,684,326 B1 | 1/2004 | Cromer et al. | |
| 6,944,699 B1 * | 9/2005 | Bugnion et al. | 710/269 |
| 7,093,239 B1 * | 8/2006 | van der Made | 717/135 |
| 7,191,440 B2 * | 3/2007 | Cota-Robles et al. | 718/1 |
| 7,376,949 B2 * | 5/2008 | Lowell et al. | 718/1 |
| 7,415,708 B2 * | 8/2008 | Knauerhase et al. | 718/1 |
| 2001/0027511 A1 | 10/2001 | Wakabayashi et al. | |
| 2002/0007456 A1 | 1/2002 | Peinado et al. | |
| 2002/0023032 A1 | 2/2002 | Pearson et al. | |
| 2002/0147916 A1 | 10/2002 | Strongin et al. | |
| 2002/0166061 A1 | 11/2002 | Falik et al. | |
| 2002/0169717 A1 | 11/2002 | Challener | |
| 2003/0037089 A1 * | 2/2003 | Cota-Robles et al. | 709/1 |
| 2003/0074548 A1 | 4/2003 | Cromer et al. | |
| 2003/0115453 A1 | 6/2003 | Grawrock | |
| 2003/0126442 A1 | 7/2003 | Glew et al. | |
| 2003/0126453 A1 | 7/2003 | Glew et al. | |
| 2003/0159056 A1 | 8/2003 | Cromer et al. | |
| 2003/0188179 A1 | 10/2003 | Challener et al. | |
| 2003/0196085 A1 | 10/2003 | Lampson et al. | |
| 2004/0117539 A1 | 6/2004 | Bennett et al. | |
| 2006/0005199 A1 * | 1/2006 | Galal et al. | 718/108 |
| 2006/0150183 A1 * | 7/2006 | Chinya et al. | 718/100 |

FOREIGN PATENT DOCUMENTS

| | | |
|---|---|---|
| EP | 0892521 | 1/1999 |
| EP | 0961193 | 12/1999 |
| EP | 0965902 | 12/1999 |
| EP | 1055989 | 11/2000 |
| EP | 1056014 | 11/2000 |
| EP | 1085396 | 3/2001 |
| EP | 1209563 | 5/2002 |
| EP | 1271277 | 1/2003 |
| WO | WO9524696 | 9/1995 |
| WO | WO9812620 | 3/1998 |
| WO | WO9918511 | 4/1999 |
| WO | WO9965579 | 12/1999 |
| WO | WO0021238 | 4/2000 |
| WO | WO0163994 | 8/2001 |
| WO | WO0201794 | 1/2002 |
| WO | WO02060121 | 8/2002 |
| WO | WO03058412 | 7/2003 |

OTHER PUBLICATIONS

Robin et al., "Analysis of the Intel Pentium's Ability to Support a Secure Virtual Machine Monitor", Naval Postgraduate School, 2000, pp. 1-16.*

Brands, Stefan, "Restrictive Blinding of Secret-Key Certificates", *Springer-Verlag XP002201306*, (1995),Chapter 3.

Coulouris, George, et al., "Distributed Systems, Concepts and Designs", *2nd Edition*, (1994),422-424.

Crawford, John, "Architecture of the Intel 80386", *Proceedings of the IEEE International Conference on Computer Design: VLSI in Computers and Processors (ICCD '86)*, (Oct. 6, 1986), 155-160.

Fabry, R.S. , "Capability-Based Addressing", *Fabry, R.S., "Capability-Based Addressing," Communications of the ACM*, vol. 17. No. 7, (Jul. 1974),403-412.

Frieder, Gideon, "The Architecture And Operational Characteristics of the VMX Host Machine", *The Architecture And Operational Characteristics of the VMX Host Machine, IEEE*, (1982),9-16.

HP Mobile Security Overview, "HP Mobile Security Overview", (Sep. 2002), 1-10.

IBM Corporation, "IBM ThinkPad T30 Notebooks", *IBM Product Specification*, located at www-1.ibm.com/services/files/cisco_t30_spec_sheet_070202.pdf, last visited Jun. 23, 2004, (Jul. 2, 2002), 1-6.

Intel, "IA-32 Intel Architecture Software Developer's Manual", vol. 3: *System Programming Guide*, Intel Corporation—2003,13-1 through 13-24.

Intel Corporation, "IA-64 System Abstraction Layer Specification", *Intel Product Specification, Order No. 245359-001*, (Jan. 2000), 1-112.

Intel Corporation, "Intel 82802AB/82802AC Firmware Hub (FWH)", *Intel Product Datasheet*, Document No. 290658-004,(Nov. 2000),1-6, 17-28.

Intel Corporation, "Intel IA-64 Architecture Software Developer's Manual", vol. 2: *IA-64 System Architecture, Order No. 245318-001*, (Jan. 2000),i, ii, 5.1-5.3, 11.1-11.8, 11.23-11.26.

Luke, Jahn, et al., "Replacement Strategy for Aging Avionics Computers", *IEEE AES Systems Magazine*, XP002190614,(Mar. 1999).

Menezes, Alfred J., et al., "Handbook of Applied Cryptography", *CRC Press Series on Discrete Mathematics and its Applications*, Boca Raton, FL, XP002165287, ISBN 0849385237,(Oct. 1996),403-405, 506-515, 570.

Nanba, S. , et al., "VM/4: ACOS-4 Virtual Machine Architecture", *VM/4: ACOS-4 Virtual Machine Architecture, IEEE*, (1985),171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Schneier, Bruce, "Applied Cryptography: Protocols, Algorithm, and Source Code in C", *Wiley, John & Sons, Inc.*, XP002939871; ISBN 0471117099, (Oct. 1995), 47-52.

Schneier, Bruce, "Applied Cryptography: Protocols, Algorithm, and Source Code in C", *Wiley, John & Sons, Inc.*, XP002138607; ISBN 0471117099, (Oct. 1995), 56-65.

Schneier, Bruce, "Applied Cryptography: Protocols, Algorithms, and Source Code C", *Wiley, John & Sons, Inc.*, XP0021111449; ISBN 0471117099, (Oct. 1995), 169-187.

Schneier, Bruce, "Applied Cryptography: Protocols, Algorithms, and Source Code in C", *2nd Edition: Wiley, John & Sons, Inc.*, XP002251738; ISBN 0471128457, (Nov. 1995),28-33; 176-177; 216-217; 461-473; 518-522.

Hall, Judith S., et al., "Virtualizing the VAX Architecture," ACM SIGARCH Computer Architecture News, Proceedings of the 18th annual international symposium on Computer architecture, vol. 19, Issue No. 3, Apr. 1991, 10 pages.

* cited by examiner

OPTIMIZING PROCESSOR-MANAGED RESOURCES BASED ON THE BEHAVIOR OF A VIRTUAL MACHINE MONITOR

FIELD

Embodiments of the invention relate generally to virtual machines, and more specifically to optimizing processor-managed resources based on the behavior of a virtual machine monitor.

BACKGROUND

A conventional virtual-machine monitor (VMM) typically runs on a computer and presents to other software the abstraction of one or more virtual machines. Each virtual machine may function as a self-contained platform, running its own "guest operating system" (i.e., an operating system (OS) hosted by the VMM) and other software, collectively referred to as guest software. The guest software expects to operate as if it were running on a dedicated computer rather than a virtual machine. That is, the guest software expects to control various events and have access to hardware resources. The hardware resources may include processor-resident resources (e.g., control registers), resources that reside in memory (e.g., descriptor tables) and resources that reside on the underlying hardware platform (e.g., input-output devices). The events may include internal interrupts, external interrupts, exceptions, platform events (e.g., initialization (INIT) or system management interrupts (SMIs)), etc.

In a virtual-machine environment, the VMM should be able to have ultimate control over these events and hardware resources to provide proper operation of guest software running on the virtual machines and for protection from and between guest software running on the virtual machines. To achieve this, the VMM typically receives control when guest software accesses a protected resource or when other events (such as interrupts or exceptions) occur. For example, when an operation in a virtual machine supported by the VMM causes a system device to generate an interrupt, the currently running virtual machine is interrupted and control of the processor is passed to the VMM. The VMM then receives the interrupt, and handles the interrupt itself or invokes an appropriate virtual machine and delivers the interrupt to this virtual machine.

BRIEF DESCRIPTION OF THE DRAWINGS

The invention may be best understood by referring to the following description and accompanying drawings that are used to illustrates embodiments of the invention. In the drawings.

DESCRIPTION OF EMBODIMENTS

Figure 1:
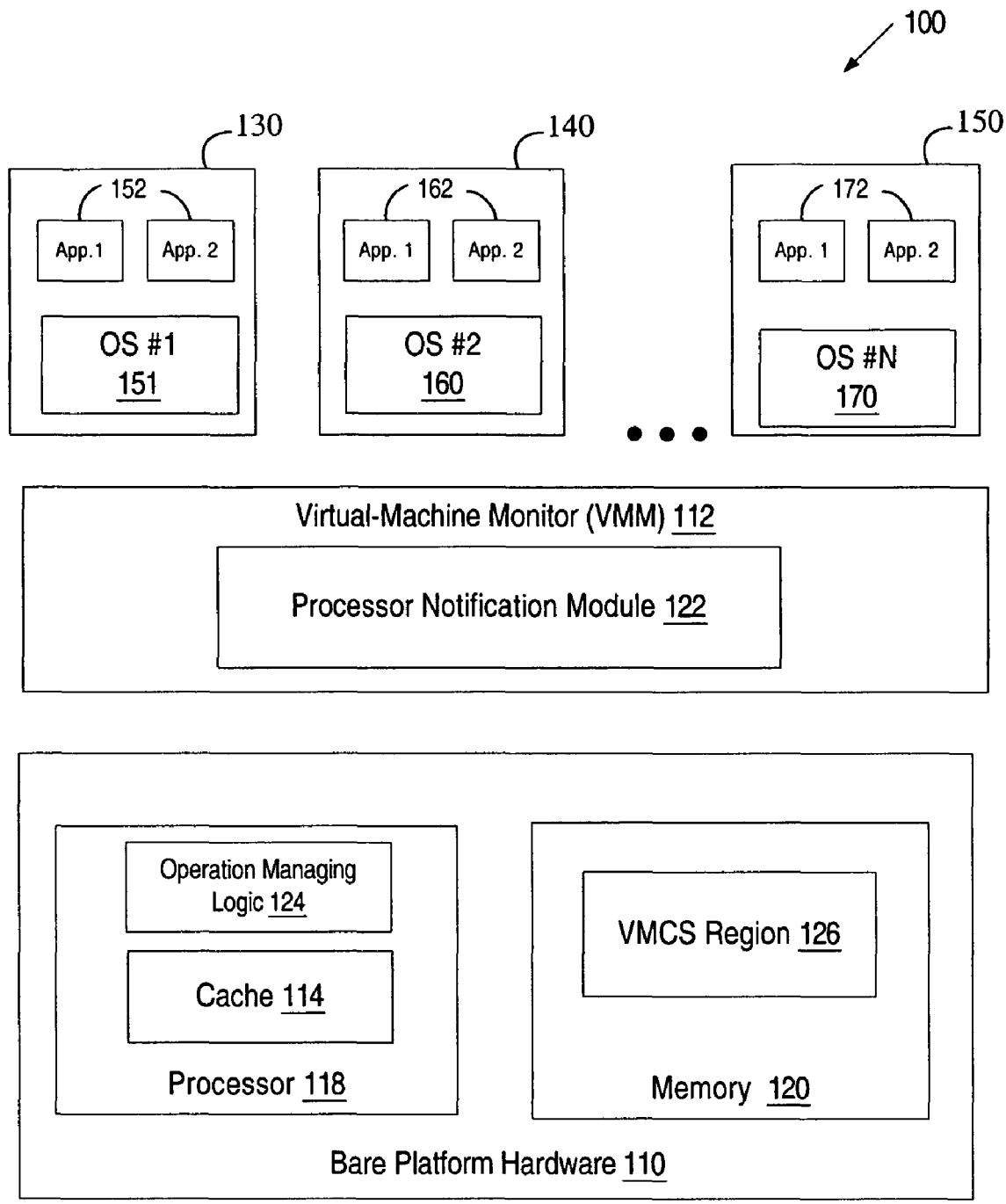
FIG. 1 illustrates one embodiment of a virtual-machine environment, in which some embodiments of the present invention may operate.

A method and apparatus for optimizing the use of processor-managed resources based on the behavior of a virtual machine monitor with respect to a virtual machine are described. In the following description, for purposes of explanation, numerous specific details are set forth. It will be apparent, however, to one skilled in the art that embodiments of the invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments.

Although the below examples may describe embodiments of the present invention in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and custom hardware components.

Thus, a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

Further, a design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. A memory, or a magnetic or optical storage such as a disc may be the machine readable medium. Any of these mediums may "carry" or "indicate" the design or software information.

FIG. 1 illustrates a virtual-machine environment 100, in which some embodiments of the present invention may operate. In the virtual-machine environment 100, bare platform hardware 110 comprises a computing platform, which may be capable, for example, of executing a standard operating system (OS) or a virtual-machine monitor (VMM), such as a VMM 112. The VMM 112, though typically implemented in software, may emulate and export a bare machine interface to higher level software. Such higher level software may comprise a standard or real-time OS, may be a highly stripped down operating environment with limited operating system functionality, or may not include traditional OS facilities. Alternatively, for example, the VMM 112 may be run within, or on top of, another VMM. VMMs and their typical features and functionality are well known by those skilled in the art and may be implemented, for example, in software, firmware or by a, combination of various techniques.

The platform hardware 110 includes at least one processor 118 and memory 120. Processor 118 can be any type of processor capable of executing software, such as a microprocessor, digital signal processor, microcontroller, or the like. Memory 120 can be any type of recordable/non-recordable media (e.g., random access memory (RAM), read only memory (ROM), magnetic disk storage media, optical storage media, flash memory devices, etc.), as well as electrical, optical, acoustical or other form of propagated signals (e.g., carrier waves, infrared signals, digital signals, etc.), any combination of the above devices, or any other type of machine medium readable by processor 118. Memory 120 may store instructions for performing the execution of method embodiments of the present invention.

The platform hardware 110 can be of a personal computer (PC), mainframe, handheld device, portable computer, set-top box, or any other computing system.

The VMM 112 presents to other software (i.e., "guest" software) the abstraction of one or more virtual machines (VMs), which may provide the same or different abstractions to the various guests. FIG. 1 shows three VMs, 130, 140 and 150. The guest software running on each VM may include a guest OS such as a guest OS 151, 160 or 170 and various guest software applications 152, 162 and 172. The guest OSs 151, 160 or 170 expect to access physical resources (e.g., processor registers, memory and I/O (Input/Output) devices, within a corresponding VM (e.g., VM 130, 140 or 150) on which the guest OS is running and to perform other functions. For example, the guest OS expects to have access to all registers, caches, structures, I/O (Input/Output) devices, memory and the like, according to the architecture of the processor and platform presented in the VM. Further, each guest OS expects to handle various events such as exceptions, interrupts, and platform events (e.g., initialization (INIT) and system management interrupts (SMIs)).

The resources that can be accessed by the guest software may either be classified as "privileged" or "non-privileged." For privileged resources, the VMM 112 facilitates functionality desired by guest software while retaining ultimate control over these privileged resources. Non-privileged resources do not need to be controlled by the VMM 112 and can be accessed by guest software.

When guest software attempts to access a privileged resource, control may be transferred to the VMM 112. The transfer of control from guest software to the VMM 112 is referred to herein as a VM exit. After facilitating the resource access or handling the event appropriately, the VMM 112 may return control to guest software. The transfer of control from the VMM to guest software is referred to as a VM entry.

In one embodiment, the processor 118 controls the operation of the VMs 130, 140 and 150 in accordance with data stored in one or more virtual machine control structures (VMCSs). A VMCS is an architecturally-defined structure that may contain state of guest software, state of the VMM 112, execution control information indicating how the VMM 112 is to limit or otherwise control operation of guest software, information controlling transitions between the VMM 112 and a VM, etc. In one embodiment, the VMCS is stored in memory 120 in a VMCS region 126. The VMCS may or may not be a contiguous area of memory storage (e.g., it may be logically assembled and accessed from a plurality of memory or storage locations). In some embodiments, multiple VMCS structures are used to support multiple VMs. In some embodiments, the format of data in the VMCS region 126 may not correspond directly to that of the architecturally-defined VMCS data. In these embodiments, VMCS access instructions (e.g., VMCS read, VMCS write) may be provided to access the VMCS region indirectly.

The processor 118 reads information from the VMCS to determine the execution environment of the VM and to constrain its behavior. For example, the processor 118 may consult the execution control information in the VMCS to determine which guest actions (e.g., execution of certain instructions, occurrence of certain exceptions, etc.) and events (e.g., external interrupts) will cause VM exits. When a VM exit occurs, components of the processor state used by guest software are saved to the VMCS, and components of the processor state required by the VMM 112 are loaded from the VMCS. When a VM entry occurs, the processor state that was saved at the VM exit is restored using data stored in the VMCS, and control is returned to guest software. State stored in the VMCS may be modified by the VMM prior to returning control to the guest software.

The VMCS is accessible to the VMM 112. The VMM 112 can allocate a memory region 126 for the VMCS, modify the VMCS content, or manipulate the VMCS in any other fashion. As noted above, VMCS access instructions (e.g., VMCS read, VMCS write) may be provided to manipulate the VMCS.

In one embodiment, the bare platform hardware 110 includes processor-managed resources associated with the VMs. The processor-managed resources are used to control the operation of the VMs and are inaccessible to the VMM 112 and guest software. One example of a processor-managed resource is an on-processor cache 114 that may be used to store some or all of the VMCS contents either temporarily or throughout its lifetime. The VMCS cache 114 can include registers, cache memory, or any other storage. In FIG. 1, the cache 114 is shown as part of the processor 118, but it may reside outside the processor 118 within any component of the bare platform hardware 110. Other examples of processor-managed resources may include on-processor registers, platform memory inaccessible to the software, etc.

The VMM 112 includes a processor notification module 122. In some embodiments, the processor notification module 122 detects that the VMM 112 is about to transfer control to a VM, determines the type of the transition and notifies the processor 118 about the type of the transition, as will be discussed in more detail below. In one embodiment, the type of the transition identifies whether this is an initial (first-time) or subsequent transition of control to this VM. In another embodiment, it may be appropriate to make the distinction in the transition type based on whether this is the first invocation since the last time the relevant VMCS was initialized.

In other embodiments, the processor notification module 122 is responsible for detecting other patterns in the behavior of the VMM 112 with respect to a VM (e.g., an attempt of the VMM 122 to modify the content of the VMCS associated with the VM, an attempt of the VMM 112 to shut down a VM, etc.). Upon determining a certain predefined pattern in the behavior of the VMM 112, the processor notification module 122 notifies the processor 118 about this pattern as will be discussed in greater detail below.

The processor 118 includes operation managing logic 124 that identifies a predefined pattern in the behavior of the VMM 112 with respect to one or more VMs and performs a set of operations according to the predefined pattern, as will be discussed in more detail below. In one embodiment, the operation managing logic 124 identifies a predefined pattern in the behavior of the VMM 112 based on the notification received from the processor notification module 122 of the VMM 112. In another embodiment, the operation managing logic 124 identifies a predefined pattern in the behavior of the VMM 112 based on logic within the processor 118 (e.g., prediction logic or a history mechanism, as will be described below).

In one embodiment, in which the bare platform hardware 110 includes processor-managed resources associated with the VMs (e.g., on-processor cache 114), the operation managing logic 124 manages the use of the processor-managed resources based on the behavior of the VMM 112 with respect to the VMs, as will be discussed in more detail below.

Figure 2:
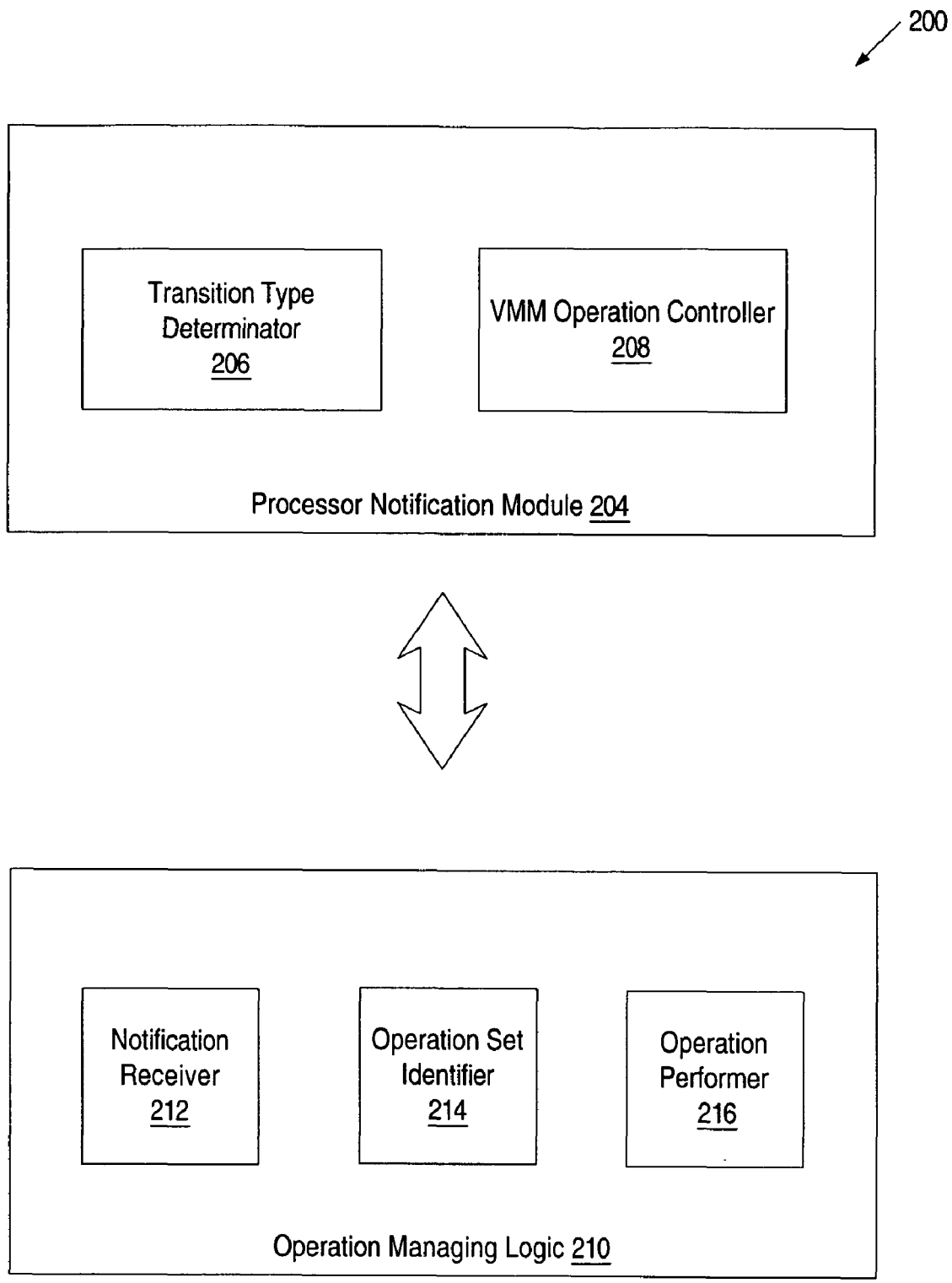
FIG. 2 is a block diagram of one embodiment of a system for managing operation of a processor based on the type of VM entry.

FIG. 2 is a block diagram of one embodiment of a system 200 for managing operation of a processor based on the type of VM entry. Generally, the system 200 contains a processor notification module 204 residing in a VMM and operation managing logic 210 residing in a processor.

In one embodiment, the processor notification module 204 includes a transition type determinator 206 and a VMM operation controller 208. The transition type determinator 206 determines the type of a transition that is about to occur from the VMM to a VM. In one embodiment, the type of the transition is either an initial transition to a specific VM (e.g., when the VMM invokes the VM for the first time) or a subsequent transition to the VM. In another embodiment, the type of the transition is either a first invocation of a VM after the most recent initialization of a corresponding VMCS or a subsequent invocation of this VM. In one embodiment, the transition type determinator 206 determines the type of the transition using an indicator maintained in an internal data structure of the VMM for a corresponding VM.

In another embodiment, the type of the transition specifically identifies how many times this VM has already been invoked by the VMM (e.g., whether the current transition is a third transition to this VM, a fourth transition, a seventh transition, etc.). In one embodiment, the invocation number is determined using a counter maintained in an internal data structure of the VMM for a corresponding VM.

The VMM operation controller 208 is responsible for performing a set of VMM operations associated with a specific type of the transition. In one embodiment, if the transition that is about to occur is an initial transition to a certain VM, the VMM operation controller 208 allocates a memory region for a VMCS associated with the VM, provides the processor with a pointer to the VMCS, requests the processor to set execution control information and state information in the VMCS, and notifies the processor that the requested transition is a first-time transition to this VM. If the transition that is about to occur is a subsequent transition to a certain VM, the VMM operation controller 208, as required, requests the processor to update execution control information and state information in the VMCS and notifies the processor that the requested transition is a subsequent transition to this VM.

In one embodiment, the operation managing logic 210 includes a notification receiver 212, an operation set identifier 214, and an operation performer 216. The notification receiver 212 is responsible for receiving a notification of a transition type from the processor notification module 204. The operation set identifier 214 is responsible for choosing a set of operations that is to be performed by the processor for this transition type. The operation performer 216 is responsible for performing the set of operations defined by the operation set identifier 214. The set of operations may include, for example, verifying state information components, loading guest state from the VMCS into the processor, storing VMM state to the VMCS, etc. In some embodiments, the operations to be performed by the processor also pertain to the utilization of processor-managed resources (e.g., an on-processor cache).

Figure 3:
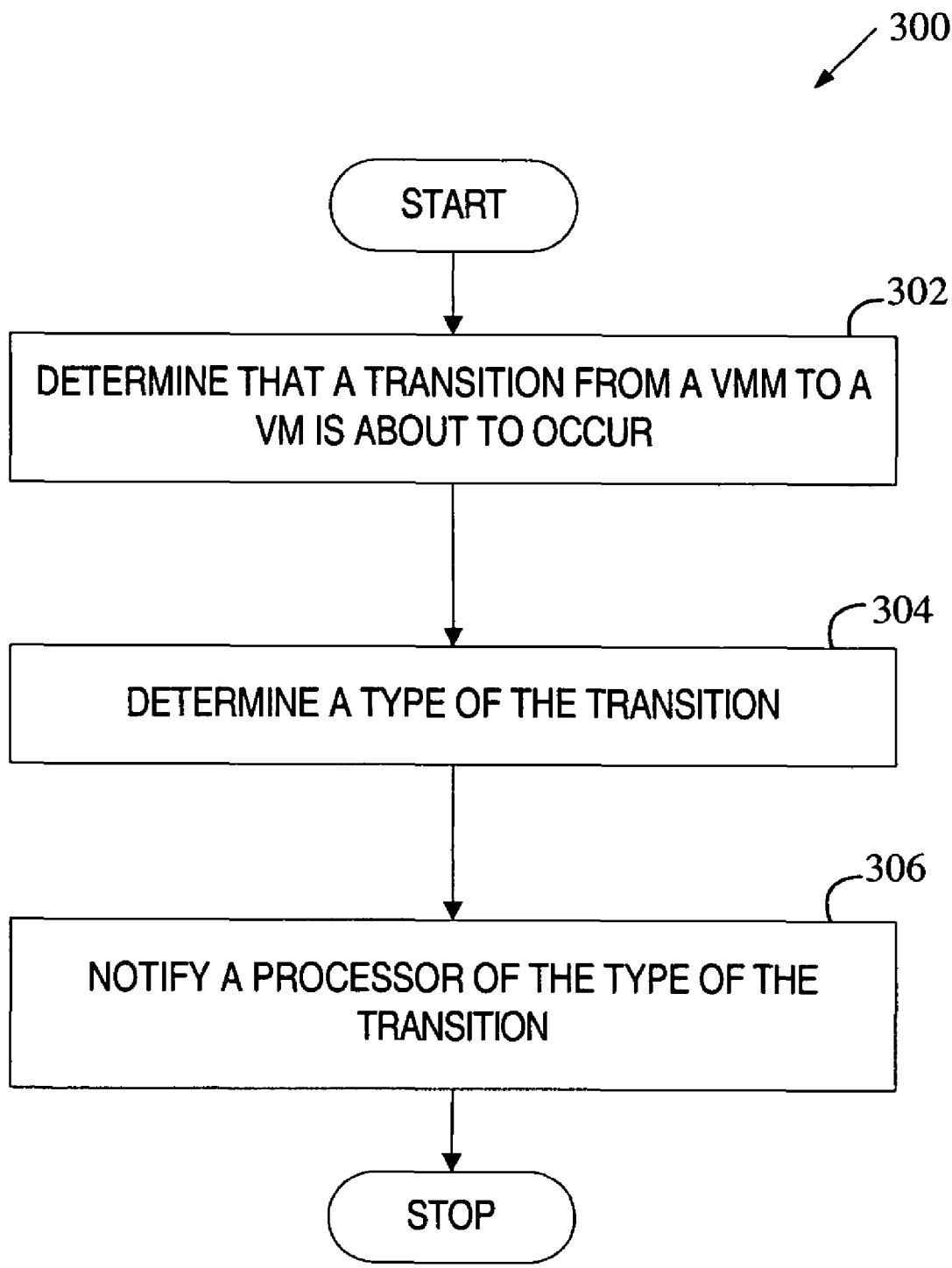
FIG. 3 is a flow diagram of one embodiment of a process for distinguishing between different types of VM entry.

FIG. 3 is a flow diagram of one embodiment of a process for distinguishing between different types of VM entry. The process may be performed by processing logic that may comprise hardware (e.g., circuitry, dedicated logic, programmable logic, microcode, etc.), software (such as run on a general purpose computer system or a dedicated machine), or a combination of both. In one embodiment, processing logic resides in the VMM.

Referring to FIG. 3, process 300 begins with processing logic determining that a transition of control to a VM is about to occur (processing block 302). Next, processing logic determines the type of the transition (processing block 304). In one embodiment, the type of the transition specifies whether the transition that is about to occur is a first-time transition from the VMM to a specific VM or a subsequent transition to a specific VM. In another embodiment, the type of the transition specifies how many times a specific VM has already been invoked by the VMM. In yet another embodiment, the type of the transition specifies whether the transition is a first-time transition to a specific VM, an intermediate transition to a specific VM, or the last transition to a specific VMM.

Further, processing logic notifies a processor of the type of the transition (processing block 306). The notification can be achieved using any mechanism known in the art. In one embodiment, each transition type is associated with a distinct instruction that is executed by the VMM to notify the processor about the transition type. For example, the VMM may execute a VM launch instruction to inform the processor about a first-time transition to the VM and a VM resume instruction to inform the processor about a subsequent invocation of the VM.

Figure 4:
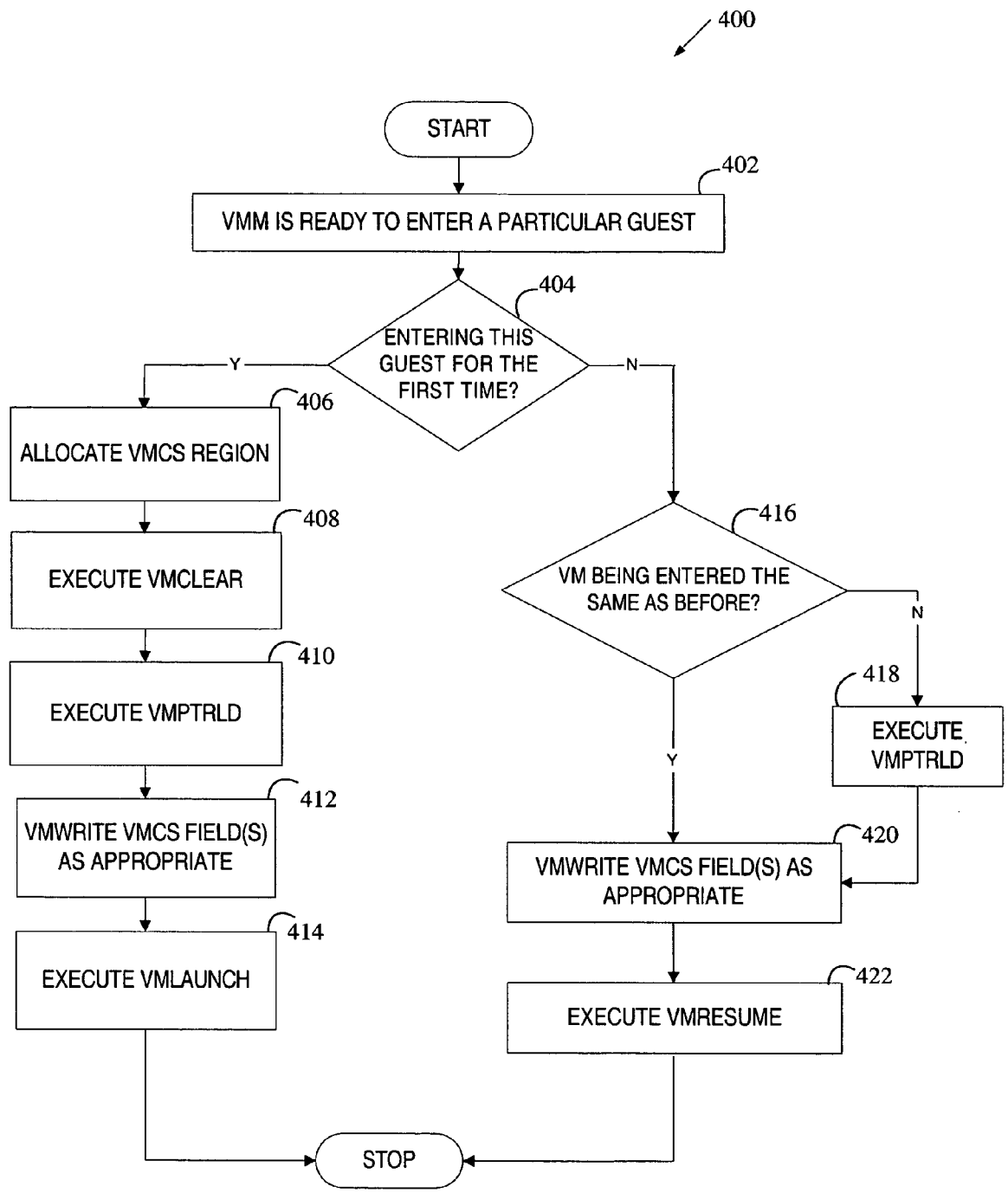
FIG. 4 is a flow diagram of one embodiment of a process for distinguishing between an initial VM entry and a subsequent VM entry.

FIG. 4 is a flow diagram of one embodiment of a process for performing an initial VM entry or a subsequent VM entry. The process may be performed by processing logic that may comprise hardware (e.g., circuitry, dedicated logic, programmable logic, microcode, etc.), software (such as run on a general purpose computer system or a dedicated machine), or a combination of both. In one embodiment, processing logic resides in the VMM.

Referring to FIG. 4, process 400 begins with processing logic determining that the VMM is ready to enter a particular guest (processing block 402). Next, processing logic determines whether this is the first entry to the guest (processing block 404). The determination may be made using an indicator in an internal data structure of the VMM. If the determination is positive, processing logic allocates memory for a VMCS region (processing block 406) and requests the processor to initialize the VMCS (processing block 408). In an embodiment shown in FIG. 4, processing logic requests the processor to initialize the VMCS by executing a VMCS clear instruction that causes the processor to set in the VMCS certain information for subsequent exclusive use by the processor (e.g., the processor sets a VMCS state indicator to a "cleared" value). In an embodiment, the VMCS clear instruction (VMCLEAR) includes a pointer to the VMCS as an operand.

Next, processing logic requests the processor to activate the VMCS (processing block 410). In an embodiment shown in FIG. 4, processing logic requests the processor to activate the VMCS by executing a VMCS pointer load instruction (VMPTRLD) that causes the processor to record a working pointer to the VMCS. The VMCS pointer load instruction includes the pointer to the VMCS as an operand.

At processing block 412, processing logic requests the processor to set execution control information, VMM state and guest state in the VMCS. In an embodiment shown in FIG. 4, processing logic requests the processor to set each component of the above information by executing a VMCS write instruction (VMWRITE) that causes the processor to load the component of the VMCS from a processor register or a memory location. The VMCS write instruction includes an operand that identifies a component of the VMCS to which data is to be written.

Further, processing logic requests the processor to enter the VM for the first time (processing block 414). In an embodiment shown in FIG. 4, this request is made by executing a VM launch instruction (VMLAUNCH).

If the determination made at decision box 404 is negative (i.e., it is not a first time VM entry), processing logic determines whether the VMCS associated with the VM to be entered is active. In the embodiment shown in FIG. 4, only a single VMCS may be active and hence processing logic determines if the VM that is to be entered is the same as the VM that was entered at the last transition from the VMM to a VM (decision box 416). If the determination is negative (e.g., the VMM is switching from one guest to another), processing logic requests the processor to set the working pointer to the new VMCS (e.g., by executing the VMCS pointer load instruction) (processing block 418) and proceeds to processing block 420. In other embodiments allowing multiple active VMCSs or in embodiments that do not require the activation of a VMCS prior to a VM entry (e.g., where the VM entry instructions include explicit VMCS pointer operands), processing blocks 416 and 418 may not need to be performed. If the determination made at decision box 416 is positive, processing logic directly proceeds to processing block 420.

At processing block 420 processing logic, when necessary, requests the processor to modify the content of the VMCS (e.g., by executing the VMCS write instruction). Afterwards, processing logic requests the processor to perform a subsequent VM entry by, for example, executing a VM resume instruction (VMRESUME) (processing block 422).

Figure 5:
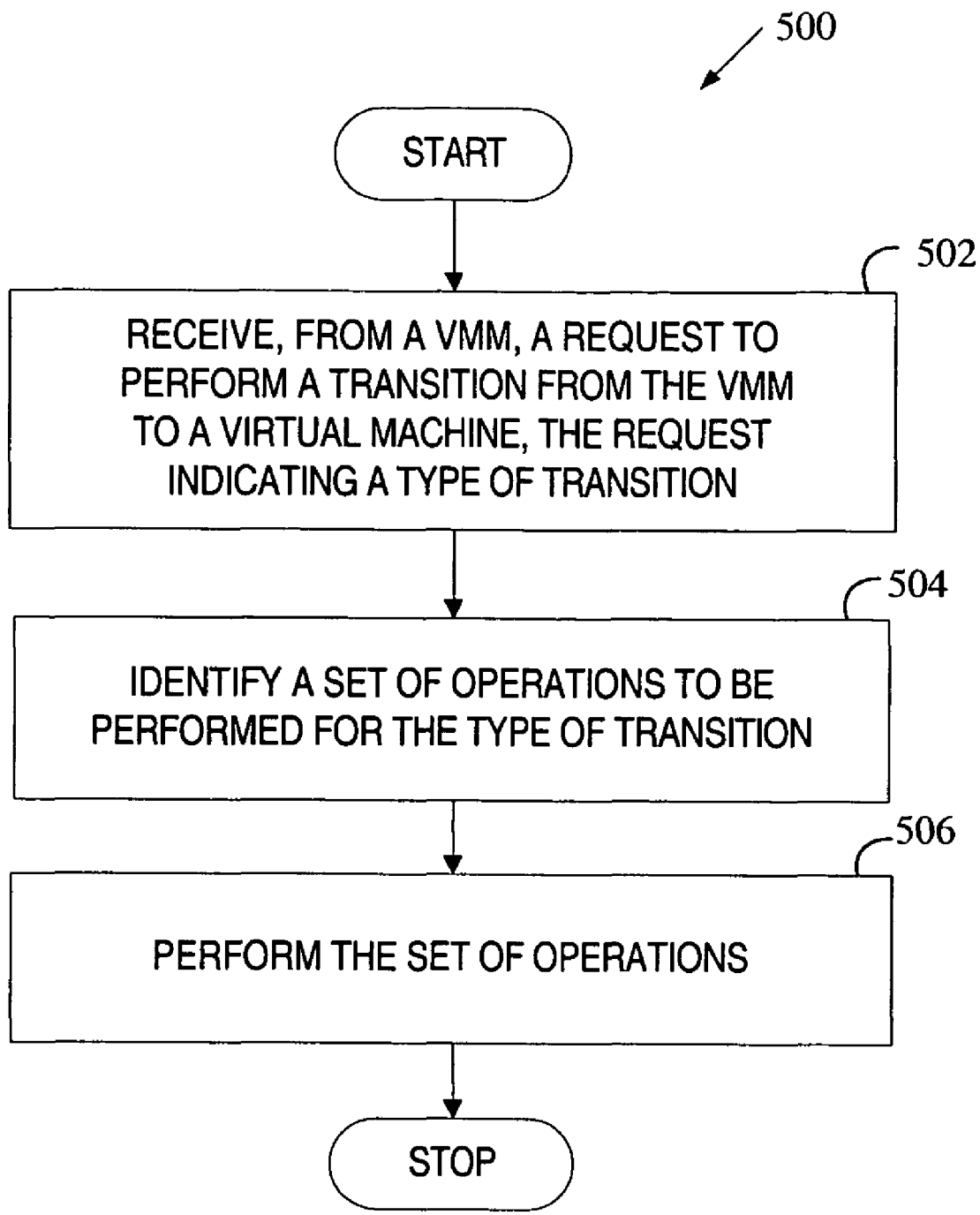
FIG. 5 is a flow diagram of one embodiment of a process for operating according to the type of a VM entry requested by a VMM.

FIG. 5 is a flow diagram of one embodiment of a process 500 for operating according to the type of a VM entry requested by a VMM. The process may be performed by processing logic that comprises hardware (e.g., circuitry, dedicated logic, programmable logic, microcode, etc.) or a combination of hardware and software.

Referring to FIG. 5, process 500 begins with processing logic receiving a request to perform a VM entry from the VMM (processing block 502). The request indicates the type of VM entry (e.g., whether the VM entry is a first-time transition to a specific VM, a subsequent transition to a specific VM, a last transition to a specific VM, etc.).

Next, processing logic identifies a set of operations to be performed for this type of VM entry (processing block 504). That is, different types of VM entry trigger different sets of processor operations. Exemplary processor operations triggered by different VM entry types will be discussed in greater detail below in conjunction with FIGS. 7A, 7B, 8A and 8B.

Further, processing logic performs the set of operations associated with the requested VM entry type (processing block 506).

In one embodiment, prior to receiving a request to perform a specific type of VM entry, processing logic receives a request to initialize a VMCS associated with the VM to which the transition is to be performed. In one embodiment, this request is made by the VMM by executing a VMCS clear instruction. As discussed above, in one embodiment, a VMCS clear instruction is provided to cause the processor to initialize a VMCS identified by the operand of the VMCS clear instruction (e.g., the operand may include a pointer to the VMCS region). In another embodiment, the VMCS clear instruction is also designated to indicate to the processor that the VMM is done with a specific VM (e.g., when the VMM is about to shut down a specific VM). In yet another embodiment, two distinct instructions are provided to perform the two functions above.

Figure 6:
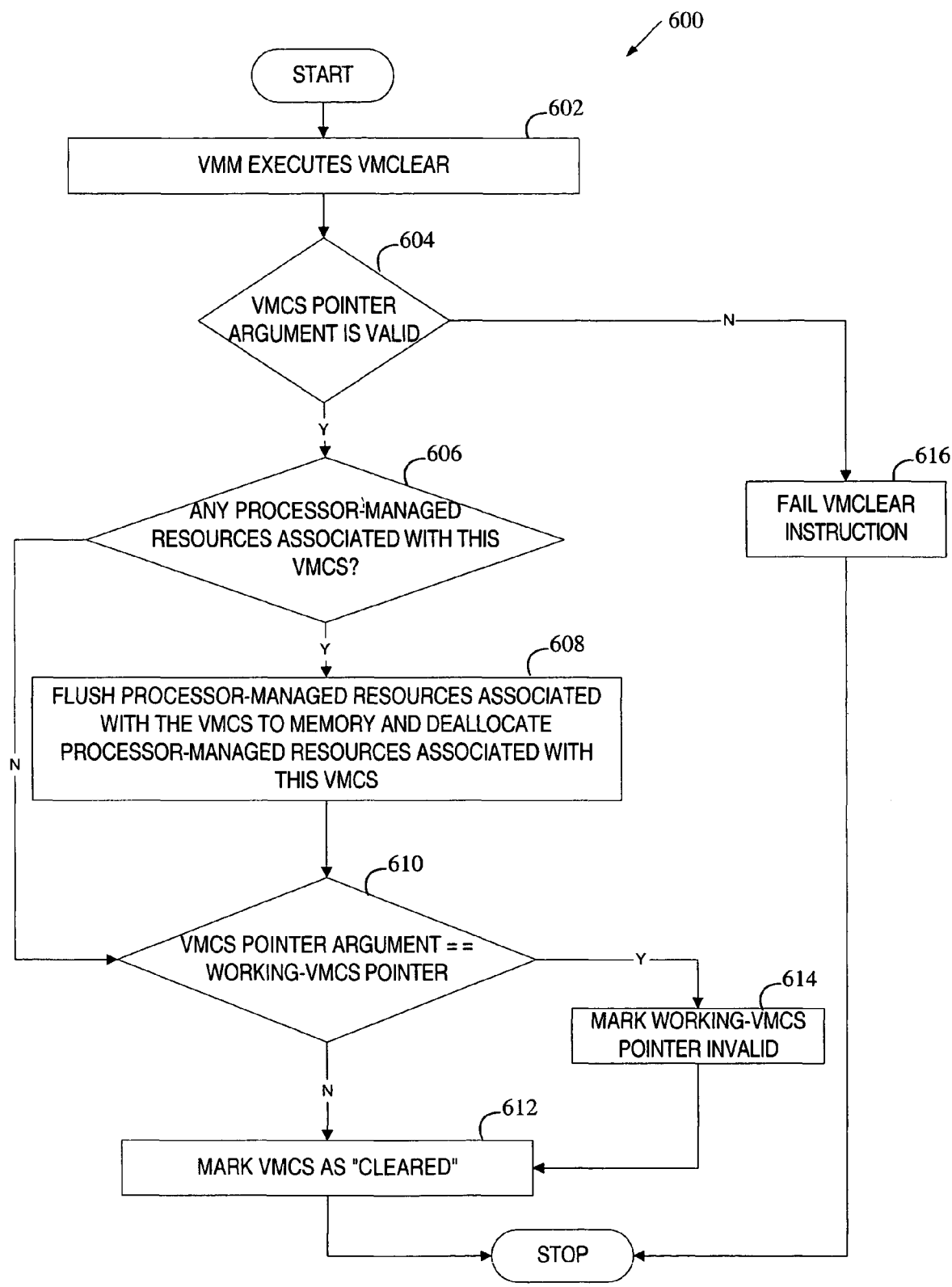
FIG. 6 is a flow diagram of one embodiment of a process for responding to a VMCS clear instruction.

FIG. 6 is a flow diagram of one embodiment of a process for responding to a VMCS clear instruction. The process may be performed by processing logic that comprises hardware (e.g., circuitry, dedicated logic, programmable logic, microcode, etc.) or a combination of hardware and software.

Referring to FIG. 6, process 600 begins with processing logic detecting the execution of the VMCS clear instruction (processing block 602). Next, processing logic checks the validity of the instruction operand (e.g., a pointer to the VMCS) (decision box 604). The validity check may be based, for example, on the requirement that the pointer to the VMCS be aligned and the revision identifier in a field of the VMCS region include a particular string. If the VMCS pointer argument is not valid, the instruction fails, setting error code bits appropriately (processing block 616). If the VMCS pointer argument is valid, processing logic determines whether there are any processor-managed resources associated with this VMCS (decision box 606). If the determination is positive processing logic next flushes any processor-managed resources associated with the VMCS to the VMCS memory region and deallocates these processor-managed resources (processing block 608).

Further, processing logic determines whether the VMCS pointer argument equals the working VMCS pointer (decision box 610). If this determination is positive, then the working VMCS pointer is invalidated (processing block 614). Afterwards, processing logic marks the VMCS memory region as being in the "cleared" state (e.g., by setting a VMCS state indicator in the VMCS to a "cleared" value) (processing block 612).

Figure 7A:
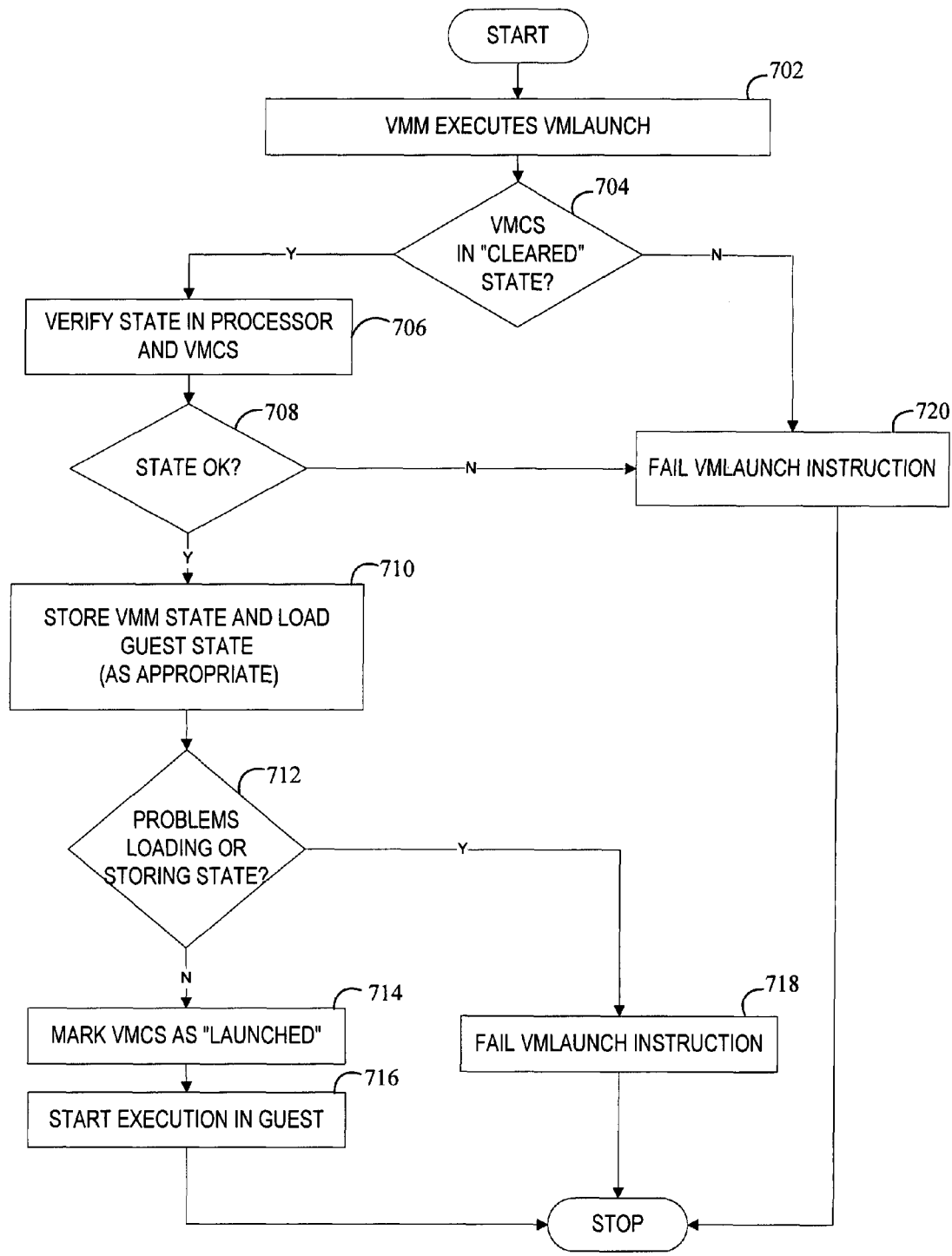
FIG. 7A is a flow diagram of one embodiment of a process for responding to a VM launch instruction executed by a VMM.

FIG. 7A is a flow diagram of one embodiment of a process for responding to a VM launch instruction executed by a VMM. The process may be performed by processing logic that comprises hardware (e.g., circuitry, dedicated logic, programmable logic, microcode, etc.) or a combination of hardware and software.

Referring to FIG. 7A, the process begins with processing logic detecting the execution of the VM launch instruction (processing block 702). In response, processing logic checks whether the VMCS is in cleared state (decision box 704). It may do this, for example, by reading a field in the VMCS memory region or by consulting processor-managed resources (e.g. an on-processor cache). If the VMCS is not in the cleared state, then processing logic fails the VM launch instruction, setting error codes and returning control to the VMM (processing block 720).

If the VMCS is in the cleared state, processing logic performs a variety of checks of the state in the processor and VMCS (processing block 706). For example, the PG (Paging) bit in the CR0 (Control Register 0) register may be required to be set following completion of the VM entry instruction. If these checks indicate errors (decision box 708), then processing logic fails the VM launch instruction, setting error codes and returning control to the VMM (processing block 720). Otherwise, if the verification checks succeed, processing logic stores VMM state to the VMCS and loads guest state from the VMCS into the processor (processing block 710). If there are problems detected during the storing or loading of state (decision box 712), processing logic fails the VM launch instruction (processing block 718). If the storing of VMM state and loading of guest state completes without error, processing logic marks the VMCS as being in the "launched" state (processing block 714) and then begins executing the guest (processing block 716).

Figure 7B:
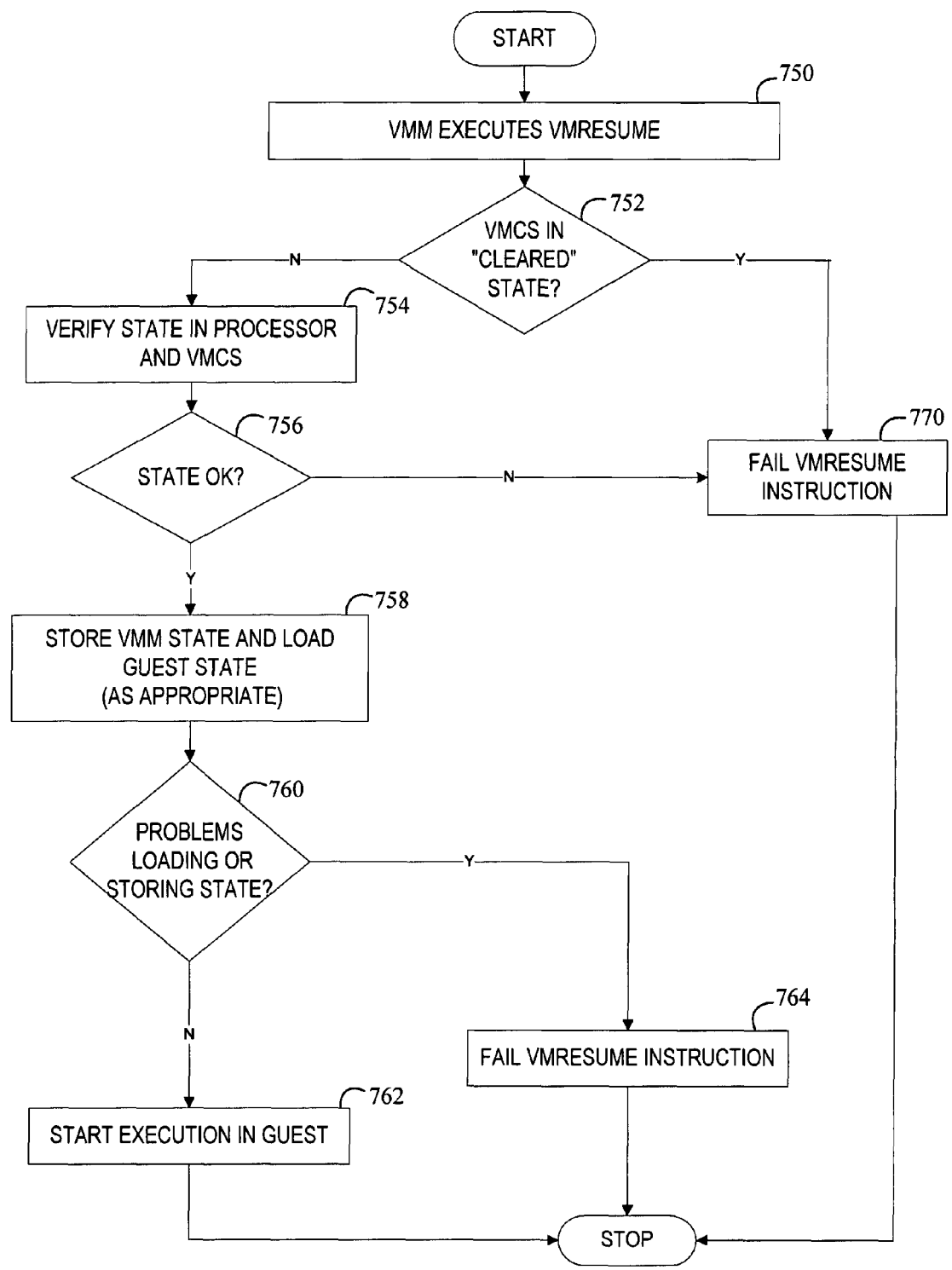
FIG. 7B is a flow diagram of one embodiment of a process for responding to a VM resume instruction executed by a VMM.

FIG. 7B is a flow diagram of one embodiment of a process for responding to a VM resume instruction executed by a VMM. The process may be performed by processing logic that comprises hardware (e.g., circuitry, dedicated logic, programmable logic, microcode, etc.) or a combination of hardware and software.

Referring to FIG. 7B, the process begins with processing logic detecting the execution of the VM resume instruction (processing block 750). In response, processing logic checks whether the VMCS is in cleared state (decision box 752). If the VMCS is in the cleared state, then processing logic fails the VM launch instruction, setting error codes and returning control to the VMM (processing block 770).

If the VMCS is not in the cleared state, processing logic performs a variety of checks of the state in the processor and VMCS (processing block 754). In one embodiment, these checks are simplified by checking only the data that was modified since the most recent successful execution of a VM entry instruction (e.g., VM launch, VM resume), as will be discussed in more detail below.

If the verification checks indicate errors (decision box 756), then processing logic fails the VM resume instruction, setting error codes and returning control to the VMM (processing block 770). Otherwise, if the verification checks succeed, processing logic stores VMM state to the VMCS and loads guest state from the VMCS into the processor (processing block 758). In one embodiment, fewer loads/stores may be performed by loading/storing only the data that was modified since the most recent successful execution of a VM entry instruction (e.g., VM launch, VM resume), as will be discussed in more detail below.

If there are problems detected during the storing or loading of state (decision box 760), processing logic fails the VM resume instruction (processing block 764). If the storing of VMM state and loading of guest state completes without error, processing logic begins executing the guest (processing block 762).

In one embodiment, the bare platform hardware includes processor-managed resources to support virtual machine operation. For example, the processor may implement on-processor cache storage for some or all of the state in the VMCS. As a result, the processor may need to load state from the VMCS region in memory only at the first entry to a particular VM (e.g., at the VM launch instruction). In subsequent entries to the VM (e.g., at the VM resume instruction), it may access on-processor storage. The use of processor-managed storage may improve performance because (1) it may eliminate cache pollution due to the VMCS region being read into the traditional cache hierarchy; and (2) the on-processor storage may perform better than the traditional cache hierarchy (e.g., the latency to this storage may be lower since it may not be subject to delays introduced by the memory management unit and long machine pipelines, more bandwidth may be available to this specialized memory, etc.).

Figure 8A:
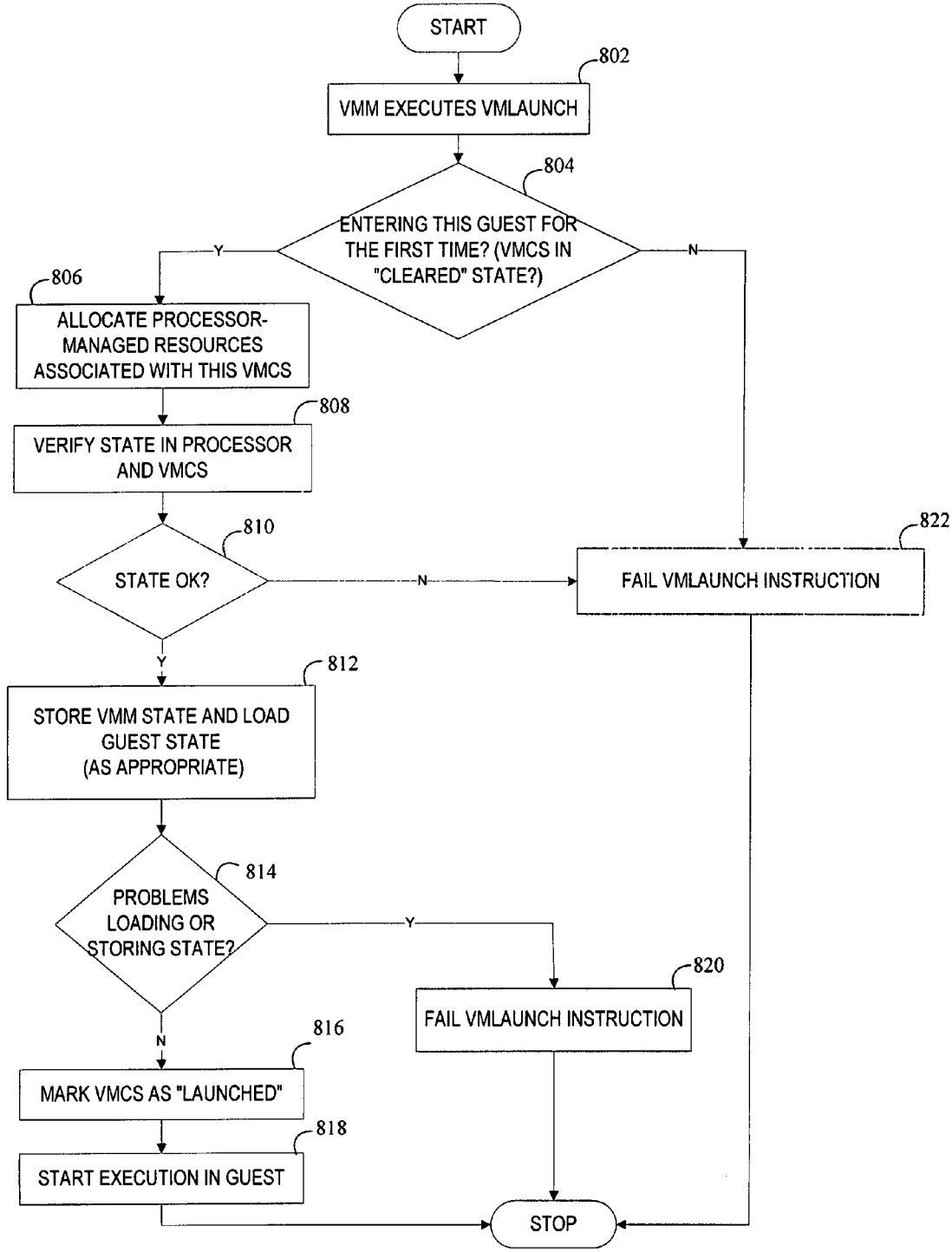
FIG. 8A is a flow diagram of one embodiment of a process for controlling use of processor-managed resources in response to a VM launch instruction executed by a VMM.

FIG. 8A is a flow diagram of one embodiment of a process for controlling use of processor-managed resources in response to a VM launch instruction executed by a VMM. The process may be performed by processing logic that comprises hardware (e.g., circuitry, dedicated logic, programmable logic, microcode, etc.) or a combination of hardware and software.

Referring to FIG. 8A, the process begins with processing logic in the processor detecting the execution of the VM launch instruction (processing block 802). In response, processing logic checks whether the VMCS is in cleared state (decision box 804). It may do this, for example, by reading a field in the VMCS memory region or by consulting processor-managed resources. If the VMCS is not in the cleared state, then processing logic fails the VM launch instruction, setting error codes and returning control to the VMM (processing block 822).

If the VMCS is in the "cleared" state, processing logic allocates processor-managed resources associated with the VMCS (processing block 806) and performs a variety of checks of the state in the processor and VMCS (processing block 808). If these checks indicate errors (decision box 810), then processing logic fails the VM launch instruction, setting error codes and returning control to the VMM (processing block 822). Otherwise, if the verification checks succeed, processing logic stores VMM state to the VMCS region and loads guest state from the VMCS into the processor (processing block 812). In one embodiment, processing logic accesses processor-managed resources during the storing/loading of state.

If there are problems detected during the storing or loading of state (decision box 814), processing logic fails the VM launch instruction (processing block 820). If the storing of VMM state and loading of guest state completes without error, processing logic marks the VMCS as being in the "launched" state (processing block 816) and then begins executing the guest (processing block 818).

Figure 8B:
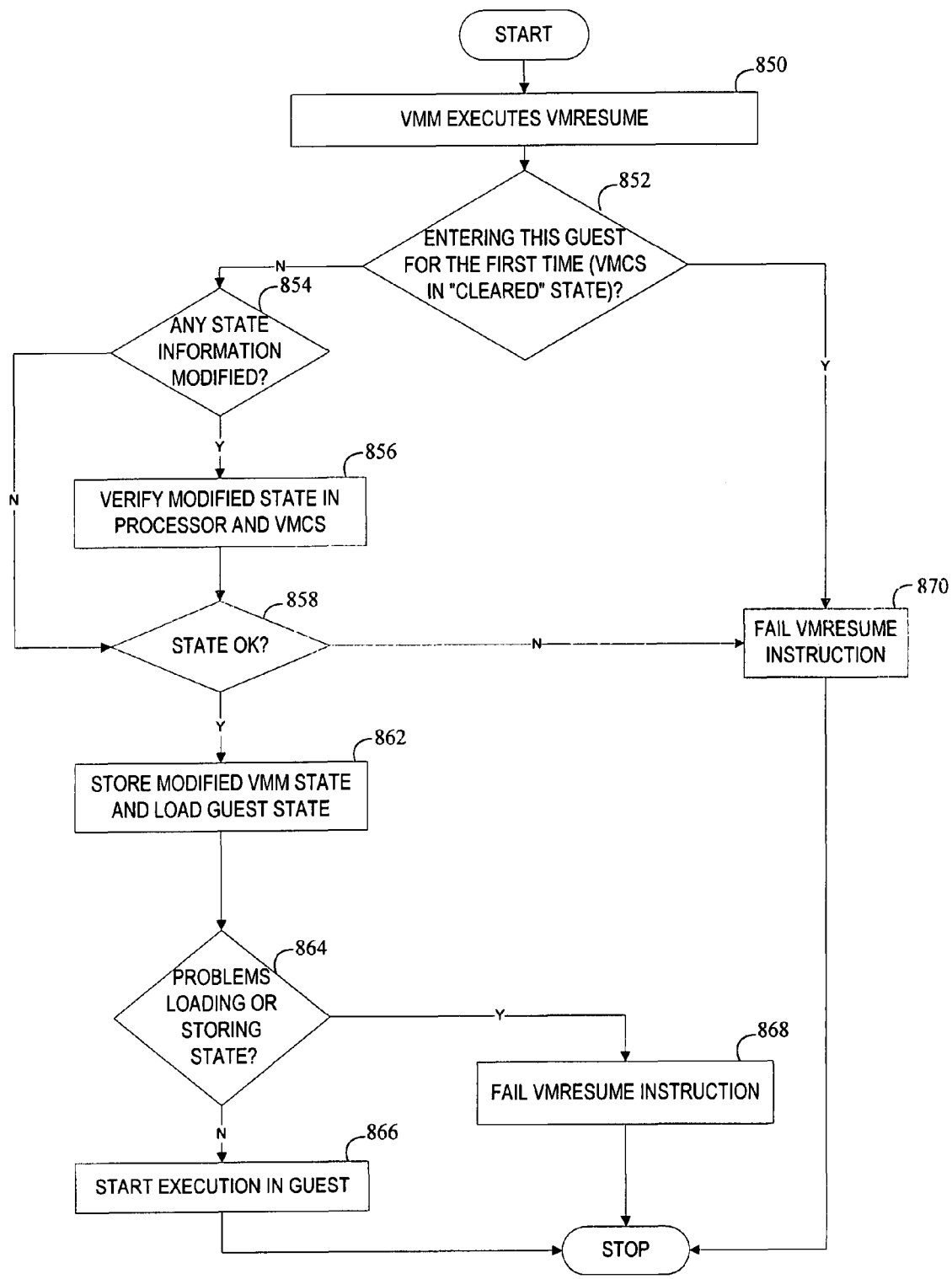
FIG. 8B is a flow diagram of one embodiment of a process for controlling use of processor-managed resources in response to a VM resume instruction executed by a VMM.

FIG. 8B is flow diagram of one embodiment of a process for controlling use of processor-managed resources in response to a VM resume instruction executed by a VMM. The process may be performed by processing logic that comprises hardware (e.g., circuitry, dedicated logic, programmable logic, microcode, etc.) or a combination of hardware and software.

Referring to FIG. 8B, the process begins with processing logic in the processor detecting the execution of the VM resume instruction (processing block 850). In response, processing logic checks whether the VMCS is in cleared state (decision box 852). If the VMCS is in the cleared state, then processing logic fails the VM launch instruction, setting error codes and returning control to the VMM (processing block 870).

If the VMCS is not in the cleared state, processing logic determines whether any state information has been modified since the most recent successful execution of the VM launch/ VM resume instruction (decision box 854). In one embodiment, processing logic is aware of a modification because the modification has resulted from the execution of a VMCS write instruction which caused processing logic to modify data in the VMCS and to invalidate the corresponding data in the processor-managed storage.

If any state information has been modified, processing logic verifies the modified state in the processor and VMCS (processing block 856). Additionally, the processing logic may load data into processor-managed resources. In another embodiment, only the checks that depend on the state information that has been modified are performed. In yet another embodiment, all checks are performed if any state information has changed.

If the verification checks indicate errors (decision box 858), then processing logic fails the VM resume instruction, setting error codes and returning control to the VMM (processing block 870). Otherwise, if the verification checks succeed, processing logic stores VMM state to the VMCS and loads guest state from the VMCS into the processor (processing block 862). In some embodiments, the loading of guest state and the storing of VMM state will make use of processor-managed resources (e.g., on-processor cache structures).

If there are problems detected during the storing or loading of state (decision box 864), processing logic fails the VM resume instruction (processing block 868). If the storing of modified VMM state and loading of modified guest state completes without error, processing logic begins executing the guest (processing block 866).

Accordingly, processor operation in response to the VM resume instruction is simplified. In particular, some necessity for validation of state in VMCS is removed because the processor can guarantee that state stored in processor-managed resources has not been "scribbled" by software. For example, a processor may be required to verify that the CR0 PG (Control Register 0 Paging) bit is set prior to entry to a guest. Assume that the CR0 (Control Register 0) field of guest state is maintained in processor-managed resources following the first entry to a guest. If, prior to a second entry to a guest, the CR0 (Control Register 0) field has not been accessed (e.g., through the execution of the VMCS write instruction), then the processor does not need to perform this validation check during the VM resume instruction (because the value in the processor-managed resource could not have been changed).

In addition, the use of processor-managed resources allows the processor to load and validate guest state only in response to the VM launch instruction and at any point where the VMM attempts to change the state in the VMCS (e.g., through the execution of the VMCS write instruction).

Embodiments of the present invention that provide for optimization of use of processor-managed resources will now be discussed in greater detail.

Figure 9:
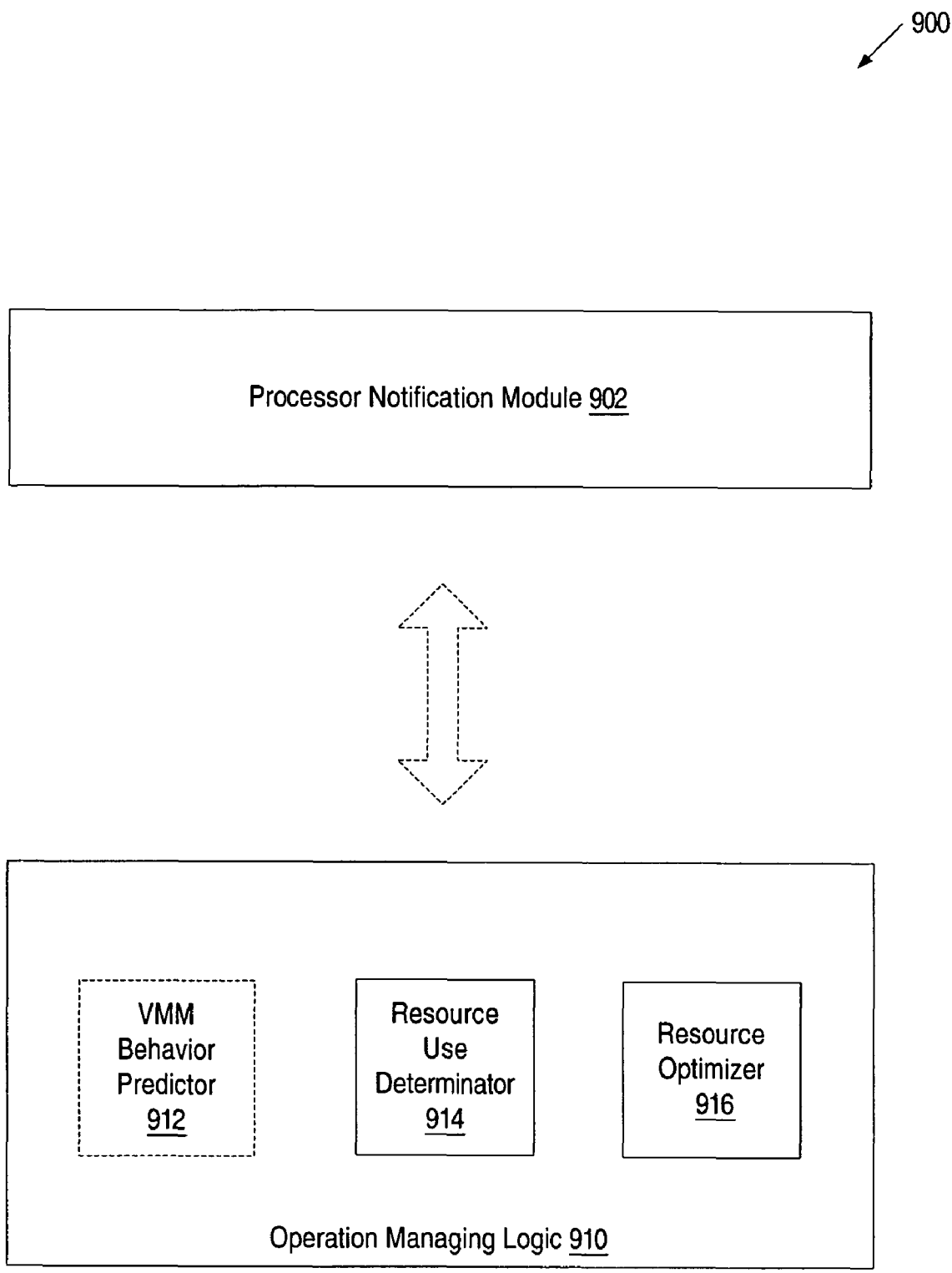
FIG. 9 is a block diagram of one embodiment of a system for optimizing use of processor-managed resources based on the behavior of a VMM with respect to VMs.

FIG. 9 is a block diagram of one embodiment of a system 900 for optimizing use of processor-managed resources based on the behavior of a VMM with respect to VMs.

The system 900 contains operation managing logic 910. In one embodiment, the operation managing logic 910 includes a resource use determinator 914 and a resource optimizer 916. The resource use determinator 914 identifies a predefined pattern in the behavior of the VMM with respect to one or more VMs and determines whether the current use of processor-managed resources needs to be adjusted in response to the behavior of the VMM. For example, the processor may need to allocate processor-managed resources for a VM when the VMM invokes this VM for a first time. Alternatively, in a system with multiple VMs, the processor may need to allocate processor-managed resources for a VM only on a fifth invocation of this VM by the VMM. In yet another example, the processor may need to deallocate processor-managed resources for a VM when the VMM is about to shut down this VM. Other examples of changes in the use of processor-managed resources may include verification of data in the processor-managed resources in response to a certain VM entry, invalidation of data in the processor-managed resources in response to the VMM modification of corresponding data in the VMCS, loading of VM state into processor-managed resources in response to a first VM exit from a certain VM, etc.

The resource optimizer 916 manages the use of the processor-managed resources based on the determination made by the resource use determinator 914.

In one embodiment, the operation managing logic 910 also includes a VMM behavior predictor 912 that is responsible for determining that a predefined pattern in the behavior of the VMM is likely to occur and passing this information to the resource use determinator 914. In one embodiment, the VMM behavior predictor 912 includes prediction logic that determines the most likely behavior of the VMM based on historical data. For example, the VMM behavior predictor 912 may record a history of VM entries, allowing it to predict that a particular VM is likely to be heavily used. Based on this information, the resource use determinator 914 may determine that processor-managed resources should be dedicated to this VM. Conversely, the prediction mechanism may determine that the VM being invoked is not likely to be invoked frequently and may not allocate processor-managed resources for it.

In another embodiment, the resource use determinator 914 receives information about the behavior of the VMM from a processor notification module 902 residing in the VMM. The processor notification module 902 is responsible for notifying the processor about certain patterns in the VMM behavior (e.g., a first-time invocation of a VM, a subsequent invocation of a VM, a last invocation of a VM, modification of the VMCS associated with a VM, a request to initialize the VMCS, a request to activate the VMCS, etc.). In one embodiment, the processor notification module 902 notifies the processor by executing an instruction associated with a specific pattern in the VMM behavior (e.g., a VM launch instruction, a VM resume instruction, a VMCS write instruction, a VMCS clear instruction, a VMCS pointer load instruction, etc.).

Figure 10:
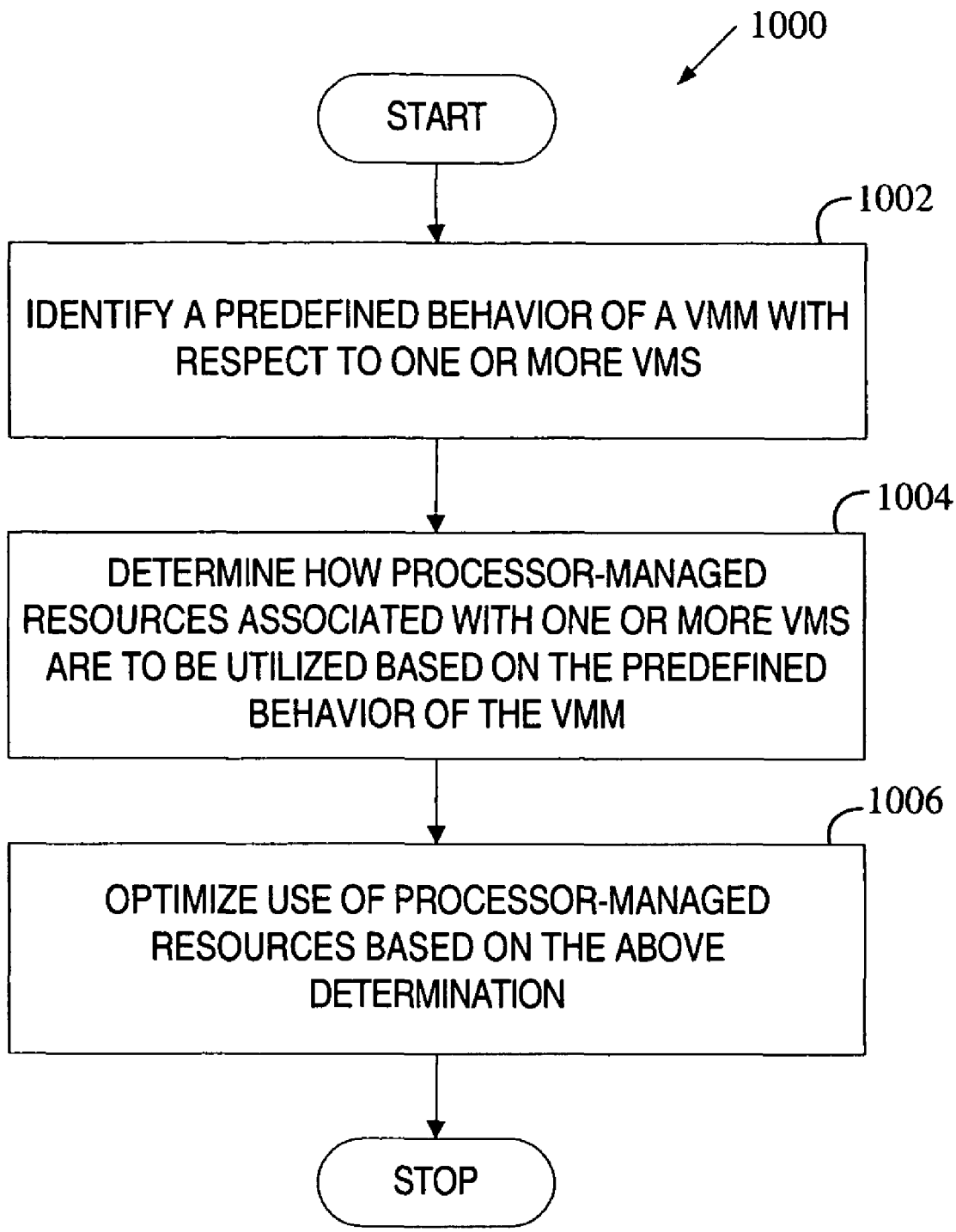
FIG. 10 is a flow diagram of one embodiment of a process for optimizing processor-managed resources according to the behavior of the VMM with respect to one or more VMs.

FIG. 10 is a flow diagram of one embodiment of a process 1000 for optimizing processor-managed resources according to the behavior of the VMM with respect to one or more VMs. The process may be performed by processing logic that comprises hardware (e.g., circuitry, dedicated logic, programmable logic, microcode, etc.) or a combination of hardware and software.

Referring to FIG. 10, the process 1000 begins with processing logic in the processor identifying a predefined pattern in the behavior of the VMM with respect to one or more VMs (processing block 1002). In one embodiment, the predefined pattern in the behavior of the VMM is identified based on the information received from the VMM (e.g., via an execution of a designated instruction). In another embodiment, the predefined pattern in the behavior of the VMM is identified based on the determination made by logic within the processor (e.g., prediction logic).

Next, processing logic determines how processor-managed resources associated with the VM are to be utilized based on the behavior of the VMM (processing block 1004). Exemplary uses of processor-managed resources include allocation or deallocation of certain processor-managed resources, invalidation of data stored in processor-managed resources, verification of data stored in processor-managed resources, loading of data into processor-managed resources, etc.

Further, at processing block 1006, processing logic proceeds with the optimization of the processor-managed resources according to the determined use.

Figure 11:
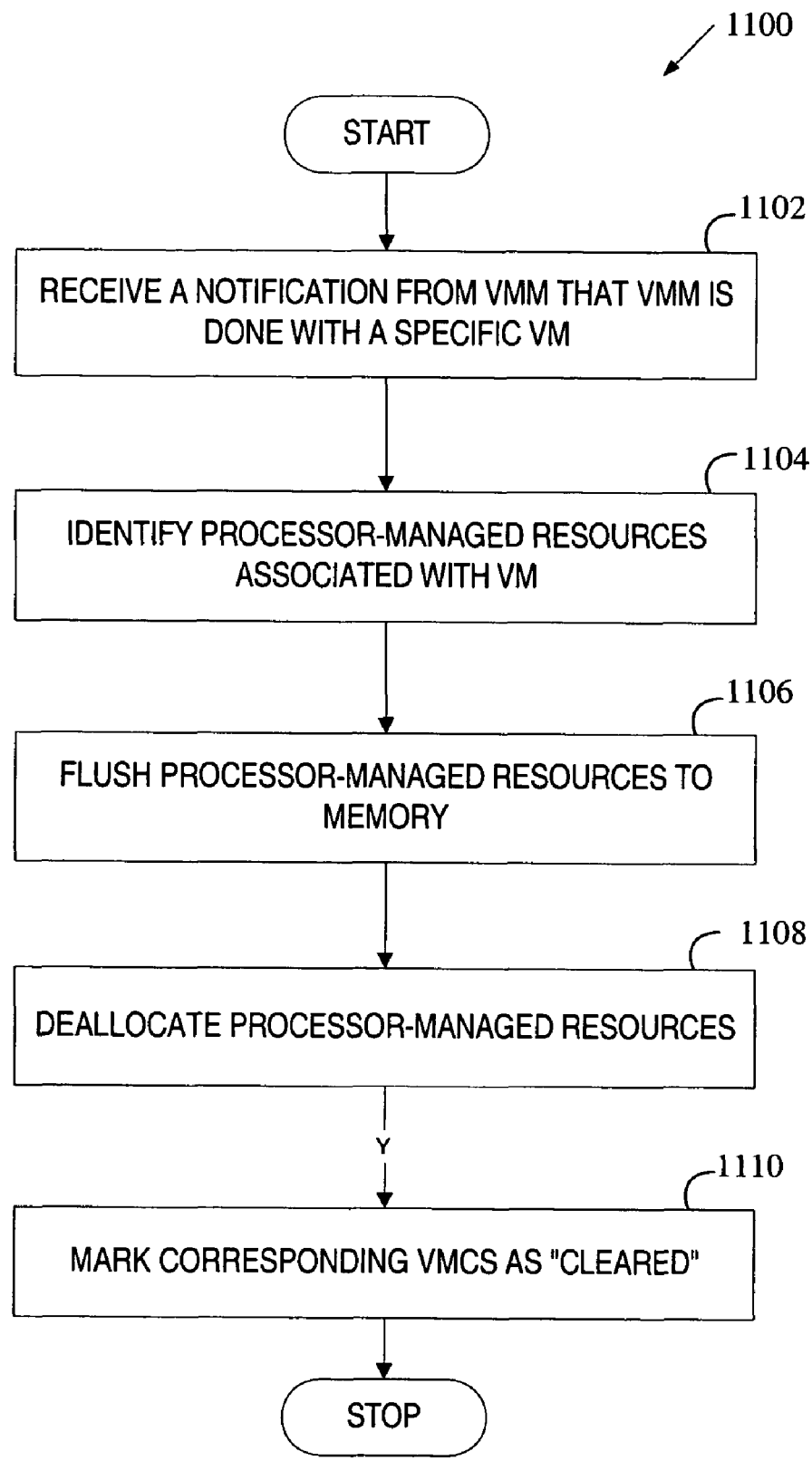
FIGS. 11 and 12 illustrate exemplary processes for responding to a change in the behavior of the VMM, according to two embodiments of the present invention.
Figure 12:
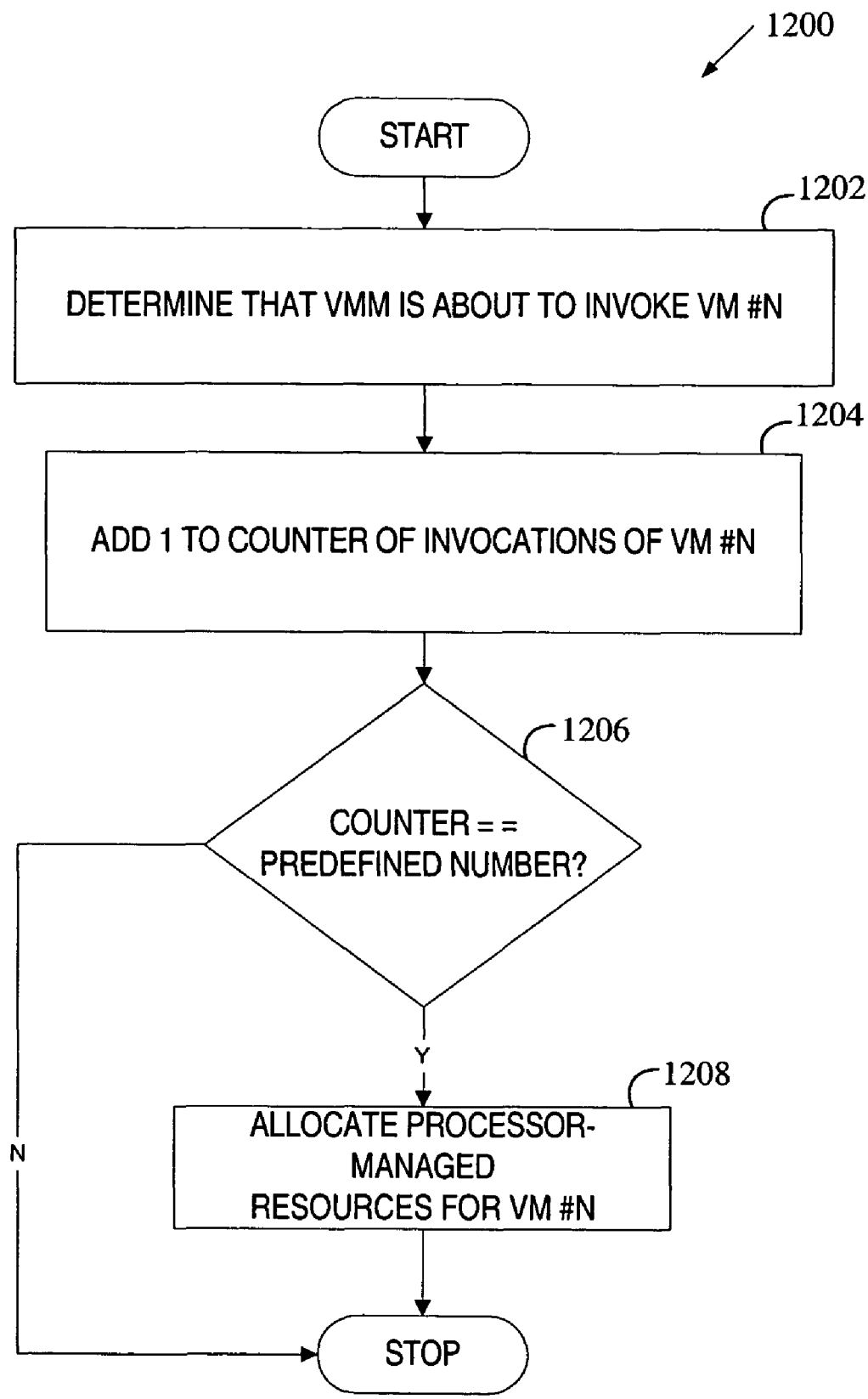

FIGS. 11 and 12 illustrate exemplary processes for responding to a change in the behavior of the VMM, according to two embodiments of the present invention.

Referring to FIG. 11, process 1100 begins with processing logic receiving a notification from the VMM that the VMM will not invoke VM 1 anymore (processing block 1102). In one embodiment, this notification is done by executing a VMCS clear instruction.

In response, processing logic identifies processor-managed resources associated with VM 1 (processing block 1104), flushes the processor-managed resources to memory (processing block 1106), deallocates the processor-managed resources (processing block 1108), and marks the VMCS associated with VM 1 as cleared (processing block 1110).

Referring to FIG. 12, process 1200 begins with processing logic determining that the VMM is about to invoke VM N (processing block 1202). In one embodiment, this determination is made based on the execution of particular instructions in the VMM.

In response, processing logic increments the counter of invocations maintained for VM N (processing block 1204), determines whether the counter exceeds a predefined number (decision box 1206), and allocates processor-managed resources for VM N (processing block 1208) if the counter equals the predefined number.

Thus, for VMs that are invoked only a few times (i.e., less than the predefined number), no processor-managed resources are allocated, reducing pollution of these cache-like structures. As described above, in another embodiment, the determination made in processing blocks 1204-1208 may be replaced by a mechanism which tracks history and allocates processor-managed resources based on a prediction of the probability that a particular VM will be used frequently.

Thus, a method and apparatus for optimizing use of processor-managed resources based on the behavior of a virtual machine monitor with respect to a virtual machine have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
receiving an instruction executed by a Virtual Machine Monitor (VMM), wherein the instruction is one of a first type to indicate a first type of request or a second type to indicate a second type of request, wherein the first type is for an initial transition to a Virtual Machine (VM) and the second type is for a subsequent transition to the VM, wherein identifying the initial transition comprises determining the initial transition is about to occur by logic within a processor, wherein the logic within the processor is prediction logic;
identifying, based on whether the instruction is of the first type or the second type, that an initial transition from the VMM to the VM is about to occur; and
utilizing processor-managed resources associated with the VM based on the initial transition.

2. The method of claim 1 wherein the instruction executed by the VMM is a VM launch instruction.

3. The method of claim 1 wherein utilization of processor-managed resources includes at least one of allocation of one or more processor-managed resources, de-allocation of one or more processor-managed resources, verification of data stored in one or more processor-managed resources, invalidation of data stored in one or more processor-managed resources, and loading of data into one or more processor-managed resources.

4. An apparatus comprising a hardware platform with a processor and a memory that operate in tandem to implement:
a processor notification module in a virtual machine monitor (VMM) to notify the processor of transition from the VMM to a virtual machine (VM) using an instruction, wherein the instruction is one of a first type to indicate a first type of transition or a second type to indicate a second type of transition, wherein the first type is for an initial transition to the VM and the second type is for a subsequent transition to the VM;
a resource use determinator to identify, based on the notification, that the transition is an initial rather than a subsequent transition from the VMM to the VM;
a resource optimizer to utilize processor-managed resources including processor registers, processor cache, memory, and input/output (I/O) devices associated with the VM based on the initial transition; and
a virtual machine monitor (VMM) behavior predictor in a processor to predict the initial transition, wherein identify the initial transition comprises determine the initial transition is about to occur by prediction logic within the VMM behavior predictor.

5. The apparatus of claim 4 wherein the resource optimizer is to utilize the processor-managed resources by performing at least one of allocation of one or more processor-managed resource, de-allocation of one or more processor-managed resources, verification of data stored in one or more processor-managed resources, invalidation of data stored in one or more processor-managed resources, and loading of data into one or more processor-managed resources.

6. A system comprising:
a memory;
a processor coupled to the memory; and
processor-managed resources coupled to the processor that are associated with one or more virtual machines (VMs), wherein the processor is to:
receive an instruction executed by a Virtual Machine Monitor (VMM), wherein the instruction is one of a first type to indicate a first type of request or a second type to indicate a second type of request, wherein the first type is for an initial transition to a virtual machine (VM) and the second type is for a subsequent transition to the VM;
identify, based on whether the instruction is of the first type or the second type, that an initial from the VMM to the one or more VMs is about to occur, wherein identify the initial transition comprises determine the initial transition is about to occur by logic within a processor, wherein the logic within the processor is prediction logic, and
utilize the processor-managed resources based on the type of transition.

* * * * *